US010893230B2

(12) United States Patent
Bender et al.

(10) Patent No.: US 10,893,230 B2
(45) Date of Patent: *Jan. 12, 2021

(54) DYNAMICALLY SWITCHING CAMERAS IN WEB CONFERENCE

(71) Applicant: International Business Machines Corporation, Armonk, NY (US)

(72) Inventors: Michael Bender, Rye Brook, NY (US); Gregory J. Boss, Saginaw, MI (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,616

(22) Filed: Oct. 8, 2019

(65) Prior Publication Data

US 2020/0154077 A1 May 14, 2020

Related U.S. Application Data

(63) Continuation of application No. 16/188,601, filed on Nov. 13, 2018, now Pat. No. 10,531,039.

(51) Int. Cl.
*H04N 7/14* (2006.01)
*G06K 9/00* (2006.01)
(Continued)

(52) U.S. Cl.
CPC ......... *H04N 7/142* (2013.01); *G06K 9/00288* (2013.01); *G10L 21/0272* (2013.01);
(Continued)

(58) Field of Classification Search
CPC ...................................................... H04N 7/14
See application file for complete search history.

(56) References Cited

U.S. PATENT DOCUMENTS 8,477,174 B2 7/2013 Michaelis
9,030,520 B2 5/2015 Chu et al.
(Continued)

OTHER PUBLICATIONS

Office Action (dated May 15, 2019) for U.S. Appl. No. 16/188,601, filed Nov. 13, 2018.
(Continued)

*Primary Examiner* — Olisa Anwah
(74) *Attorney, Agent, or Firm* — Schmeiser, Olsen & Watts, LLP; Michael Petrocelli

(57) ABSTRACT

A method and system for dynamically switching between at least two cameras. A first and second video input received from a first and second camera of the at least two cameras to identify first and second directional parameters of a face of a user, respectively. A first algorithm is executed on the first and second directional parameters to identify a first and second percentage associated with facial coverage of the user, respectively. It is determined that the first percentage exceeds the second percentage and in response, the first video input is utilized to capture the face of the user and the second video input is disabled. Either the first and second cameras are attached to the device or one camera of the first and second cameras is attached to the device and another camera of the first and second cameras is attached to a monitor associated with the device.

20 Claims, 4 Drawing Sheets

(51) Int. Cl.
  *G10L 21/0272*  (2013.01)
  *H04N 7/15*  (2006.01)
  *H04N 5/247*  (2006.01)

(52) U.S. Cl.
  CPC ............. *H04N 5/247* (2013.01); *H04N 7/147* (2013.01); *H04N 7/15* (2013.01)

(56) References Cited

U.S. PATENT DOCUMENTS

| | | |
|---|---|---|
| 9,055,185 B2 | 6/2015 | Abuan et al. |
| 9,237,307 B1 | 1/2016 | Vendrow |
| 9,942,518 B1 | 4/2018 | Tangeland et al. |
| 2011/0285808 A1 | 11/2011 | Feng et al. |
| 2013/0335508 A1 | 12/2013 | Mauchly |
| 2016/0057385 A1 | 2/2016 | Burenius |
| 2016/0227168 A1* | 8/2016 | Vendrow ................ H04N 7/152 |
| 2016/0330407 A1* | 11/2016 | Okuma ................. H04N 7/147 |

OTHER PUBLICATIONS

Amendment (dated Aug. 15, 2019) for U.S. Appl. No. 16/188,601, filed Nov. 13, 2018.
Notice of Allowance (dated Aug. 28, 2019) for U.S. Appl. No. 16/188,601, filed Nov. 13, 2018.

* cited by examiner

DYNAMICALLY SWITCHING CAMERAS IN WEB CONFERENCE

This application is a continuation application claiming priority to Ser. No. 16/188,601, filed Nov. 13, 2018, now U.S. Pat. No. 10,531,039, issued Jan. 7, 2020.

FIELD

The present invention relates generally to a computer program product, a computer system, and a method executed by a master device for dynamically switching between at least two cameras in communication with the master device during a conference, where the at least two cameras are associated with a device operable by a user.

BACKGROUND

Web-based video communication and or conferences have become commonplace in today's global world as a means of keeping individuals and or businesses in touch. A continued problem facing video conferencing is the constrained views of the participants during the event. This problem may be further exacerbated by operation of only one camera to capture the video input. One camera proves especially challenging due to its singular and narrow field of capture. During the video conference, a participant may not always be looking in the direction of the camera because the participant may have two or more monitors or screens the participant is viewing. Thus, it follows that the resulting image output to the video conference may be a video of only a portion of the participant's head or, in some instances, an image without the participant in the image at all, which may lead to other participants of the video conference believing that the first participant is not paying attention, when the participant may simply be looking towards a different direction to view a separate screen to which a camera is not attached.

SUMMARY

A first aspect of the invention provides a method, and associated computer system and computer program product, executed by a master device for dynamically switching between at least two cameras in communication with the master device during a conference, where the at least two cameras are associated with a device operable by a user. The method includes: receiving a first video input from a first camera of the at least two cameras and a second video input from a second camera of the at least two cameras. Then, the method includes: analyzing the first video input to identify first directional parameters of a face of the user and the second video input to identify second directional parameters of the face of the user. The method further includes: executing an algorithm on the first directional parameters to identify a first percentage associated with facial coverage of the user; and executing the algorithm on the second directional parameters to identify a second percentage associated with facial coverage of the user. The method then includes comparing the first percentage to the second percentage; and if the first percentage is greater than the second percentage, both disabling the second video input associated with the second camera; and utilizing the first video input to capture the face of the user.

DETAILED DESCRIPTION

Figure 1:
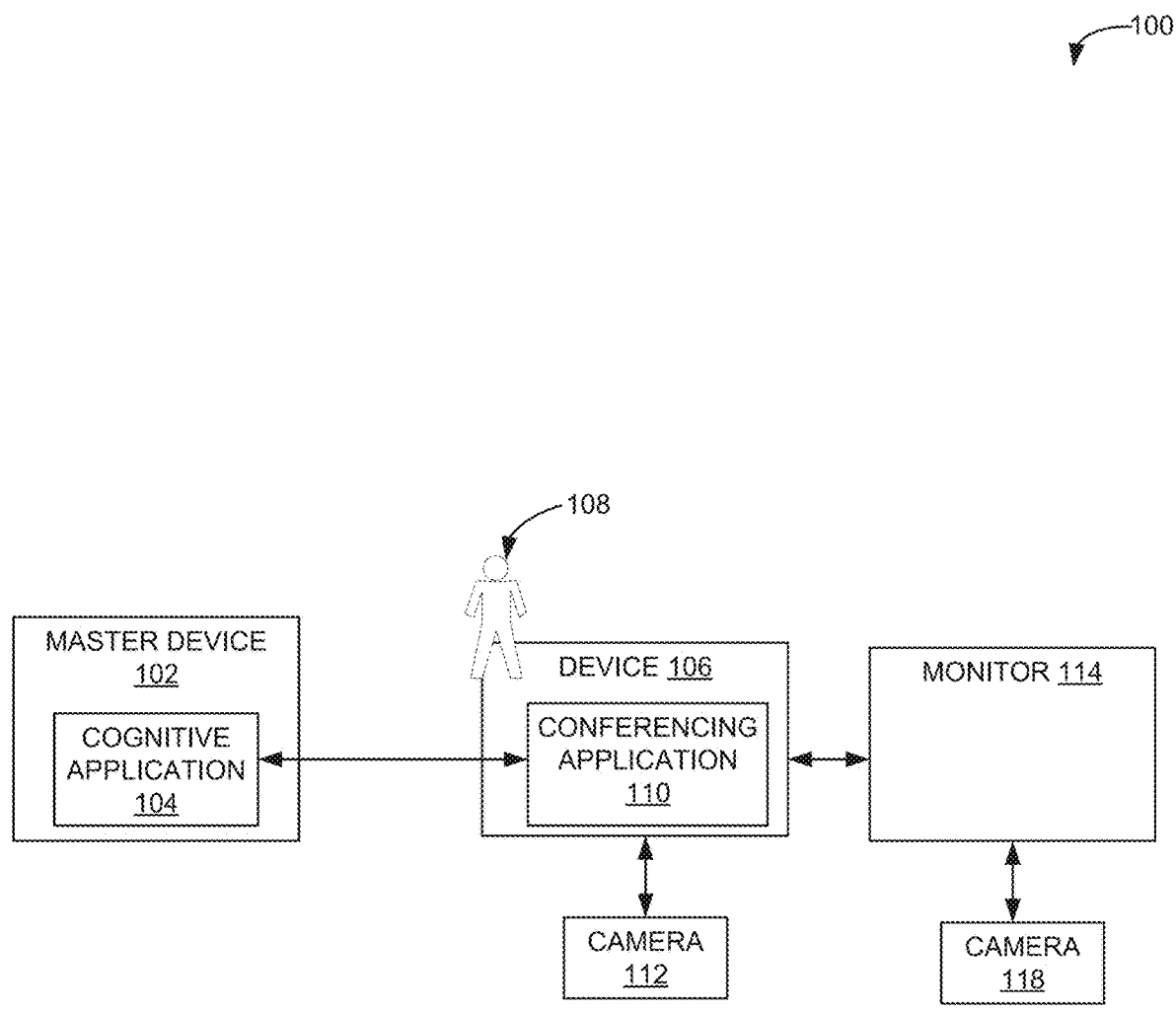
FIG. 1 illustrates a block diagram of a system executed by a master device for dynamically switching between at least two cameras in communication with the master device during a conference, where the at least two cameras are associated with a device operable by a user, in accordance with embodiments of the present invention.

FIG. 1 illustrates a block diagram of a system executed by a master device for dynamically switching between at least two cameras in communication with the master device during a conference, where the at least two cameras are associated with a device operable by a user, in accordance with embodiments of the present invention.

The system 100 of FIG. 1 includes a master device 102 associated with a device 106 operable by a user 108. The device 106 is connected at least to a monitor 114, but is not limited to such configuration and may be connected to additional monitors or screens. The master device 102 is configured to dynamically, and in real-time, switch between at least two cameras in communication with the master device 102 during a conference, such as a web-based conference. The at least two cameras include a first camera 112 connected to the device 106 and a second camera 118 connected to the monitor 114. The device 106 and the master device 102 are selected from the group consisting of: a mobile phone, a laptop, a computer, a tablet, etc.

Both the first camera 112 and the second camera 118 are static. According to some examples, the first camera 112 and the second camera 118 are registered to a web-based conferencing software package executable on the device 106. According to other examples, the first camera 112 and the second camera 118 are operable by a conferencing application 110 on the device 106. In further examples, the conferencing application 110 may be a conferencing engine or a conferencing service.

As an illustrative example, during a web-based conferencing event, the conferencing application 110 receives a first video input from the first camera 112, the first camera 112 being connected to and associated with the device 106. The conferencing application 110 also receives, from the second camera 118, which is connected to and associated with the monitor 114, a second video input. Then, the conferencing application 110 transmits the first video content and the second video content to a cognitive application 104 executed on the master device 102.

Since the user 108 may be on and participating in a web conference on the device 106, but may glance to the monitor 114 and/or may get up out of capture range of the first camera 112 and/or the second camera 118, the cognitive application 104 then analyzes the first video input to identify first directional parameters of a face of the user 108 and analyzes the second video input to identify second directional parameters of the face of the user 108. The first and the second directional parameters may include a direction of eyes of the user 108 and/or a direction of a face of the user 108. For example, the first directional parameters identify if the eyes of the user 108 and/or the face of the user 108 are directed towards the first camera 112. Similarly, the second directional parameters identify if the eyes of the user 108 and/or the face of the user 108 are directed towards the second camera 118.

Next, the cognitive application 104 executes an algorithm on the first directional parameters to identify a first percentage associated with facial coverage of the user 108 and executes the algorithm on the second directional parameters to identify a second percentage associated with facial coverage of the user 108. For example, if the first percentage is 20%, this indicates that 20% of the face of the user 108 is captured by the first camera 112 in the first video input. Similarly, if the second percentage is 25%, this indicates that 25% of the face of the user 108 is captured by the second camera 118 in the second video input.

The cognitive application 104 then compares the first percentage to the second percentage. If the cognitive application 104 identifies the first percentage as being greater than the second percentage, the cognitive application 104 disables the second video input associated with the second camera 118 and utilizes the first video input to capture the face of the user 108. However, if the cognitive application 104 identifies the second percentage as being greater than the first percentage, the cognitive application 104 disables the first video input associated with the first camera 112 and utilizes the second video input to capture the face of the user 108. This allows for the greatest facial coverage of the user to be captured.

Figure 2:
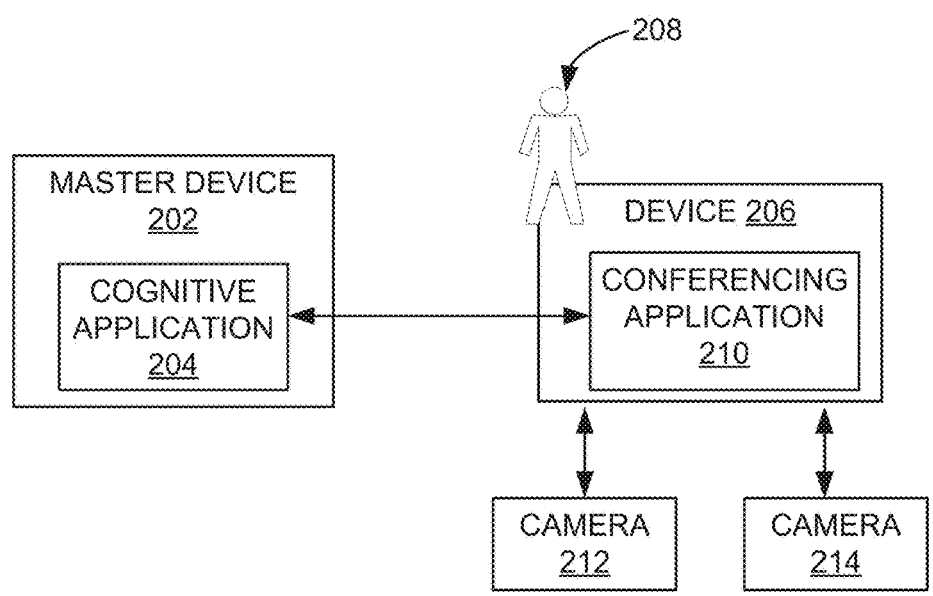
FIG. 2 illustrates a detailed block diagram of the system of FIG. 1 executed by a master device for dynamically switching between at least two cameras in communication with the master device during a conference, where the at least two cameras are associated with a device operable by a user, in accordance with embodiments of the present invention.
Figure 3:
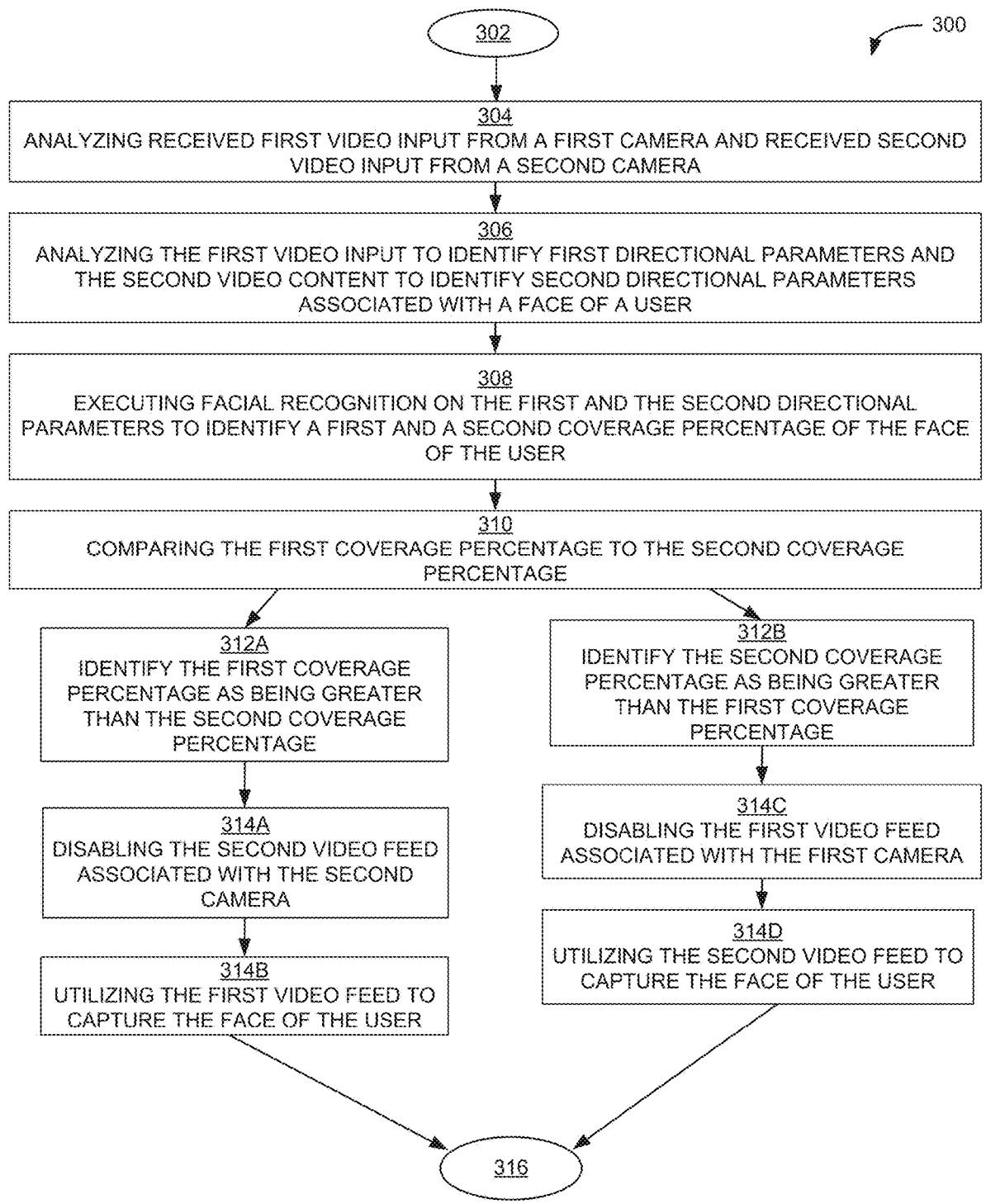
FIG. 3 is a flowchart of a process executed by a master device for dynamically switching between at least two cameras in communication with the master device during a conference, where the at least two cameras are associated with a device operable by a user, in accordance with embodiments of the present invention.
Figure 4:
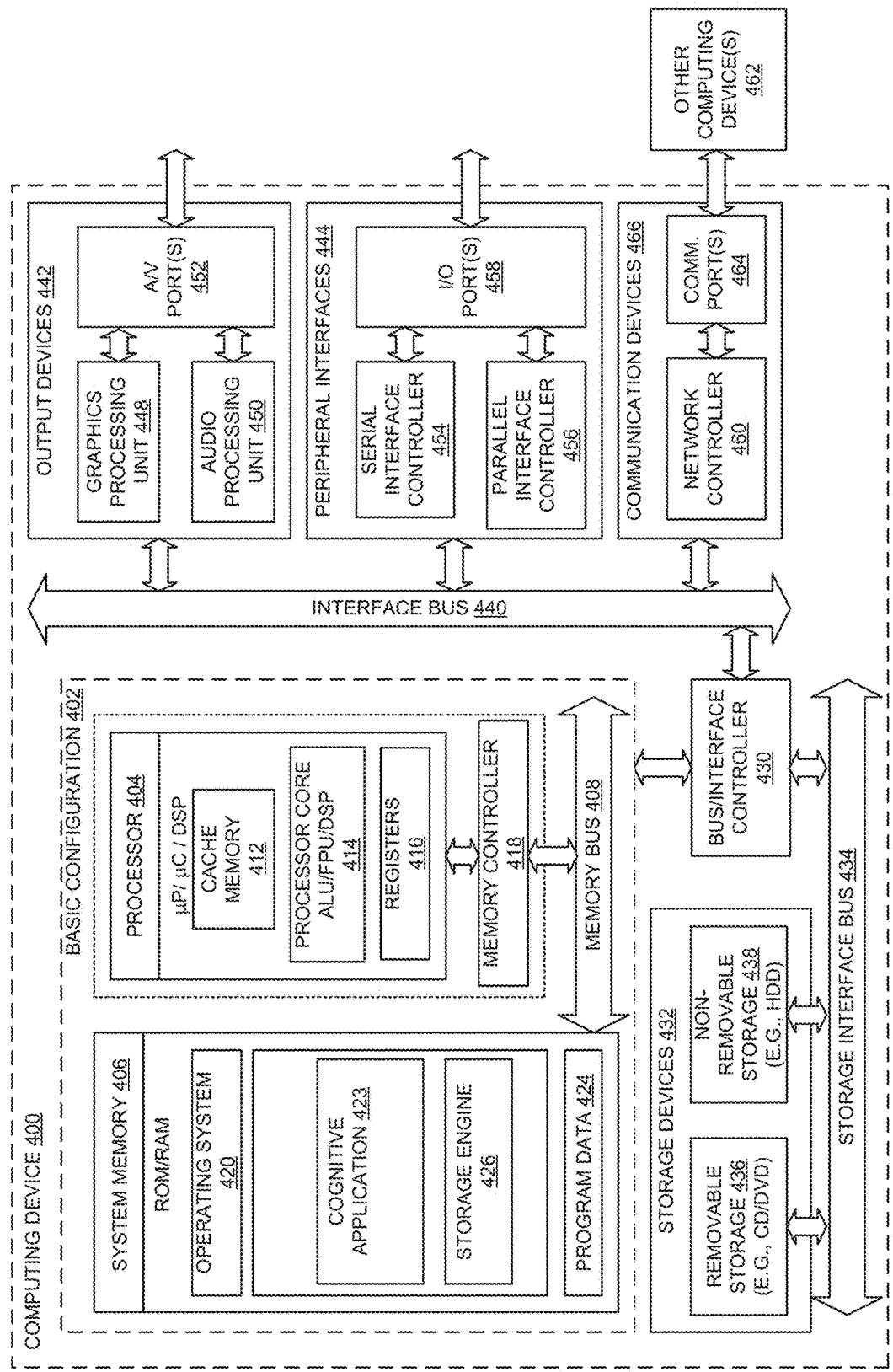
FIG. 4 is a block diagram of a computing device included within the system of FIG. 1 and that implements the process of FIG. 3, in accordance with embodiments of the present invention.

The functionality of the components shown in FIG. 1 is described in more detail in the discussion of FIG. 2, FIG. 3, and FIG. 4 presented below.

FIG. 2 illustrates a detailed block diagram of the system of FIG. 1 executed by a master device for dynamically switching between at least two cameras in communication with the master device during a conference, where the at least two cameras are associated with a device operable by a user, in accordance with embodiments of the present invention.

The system 200 of FIG. 2 include a master device 202 (similar to the master device 102 of FIG. 1) associated with a device 206 (similar to the device 106 of FIG. 1) operable by a user 208. The master device 202 is configured to dynamically switch between at least two cameras in communication with the master device 202 during a conference, such as a web-based conference. The at least two cameras include a first camera 212 and a second camera 214 connected to the device 206. However, it should be appreciated that the at least two cameras may include additional cameras not depicted herein.

Both the first camera 212 and the second camera 214 are static. According to some examples, the first camera 212 and the second camera 214 are registered to a web-based conferencing software package executable on the device 206. According to other examples, the first camera 212 and the second camera 214 are operable by a conferencing application 210 executed on the device 206. In further examples, the conferencing application 210 may be a conferencing engine or a conferencing service.

As explained in reference to FIG. 1, during a web-based conferencing event, the conferencing application 210 receives a first video input from the first camera 212 and a second video input from the second camera 214, where both the first camera 212 and the second camera 214 are connected to and associated with the device 206. It should be appreciated that differing set-up configurations are contemplated and the configuration depicted herein is not limiting. Then, the conferencing application 210 transmits the first video content and the second video content to a cognitive application 204 executable on the master device 202.

The cognitive application 204 then identifies and provides an algorithm. The algorithm analyzes the first video input to identify first directional parameters of a face of the user 208 and analyzes the second video input to identify second directional parameters of the face of the user 208. The first and the second directional parameters may include a direction of eyes of the user 208 and/or a direction of a face of the user 208. The first directional parameters identify if the eyes of the user 208 and/or the face of the user 208 are directed towards the first camera 212. Similarly, the second directional parameters identify if the eyes of the user 208 and/or the face of the user 208 are directed towards the second camera 214.

Next, the cognitive application 204 identifies and provides another algorithm. The other algorithm is executed on the first directional parameters to identify a first percentage associated with facial coverage of the user 208 and executes the algorithm on the second directional parameters to identify a second percentage associated with facial coverage of the user 208. This algorithm may include a facial recognition algorithm, among other examples. For example, if the first percentage is 20%, this indicates that 20% of the face of the user 208 is captured by the first camera 212. Similarly, if the second percentage is 25%, this indicates that 25% of the face of the user 108 is captured by the second camera 214.

The cognitive application 204 then compares the first percentage to the second percentage. If the cognitive application 204 identifies the first percentage as being greater than the second percentage, the cognitive application 204 disables the second video input associated with the second camera 214 and utilizes the first video input to capture the face of the user 208. However, if the cognitive application 204 identifies the second percentage as being greater than the first percentage, the cognitive application 204 disables the first video input associated with the first camera 212 and utilizes the second video input to capture the face of the user 208. This allows for the greatest facial coverage of the user to be captured.

However, according to some examples, the cognitive application 204 may analyze the first and the second video input and may fail to detect the first and the second directional parameters. In response, the cognitive application 204 may determine that the face of the user 208 is not captured by either the first or the second cameras. Then, the cognitive application 204 may disable the first and the second video input to save computing resources. In other examples, the cognitive application 204 may lock the master device 102 to ensure security is maintained with this device. In further examples, the cognitive application 204 may generate a notification and transmit such notification to the conferencing application 210 of the device 206 for display to the user 208.

In further examples, the conferencing application 210 may additionally receive a first audio input from the first camera 212 and a second audio input from a second camera 214. The conferencing application 210 may transmit both the first and the second audio input to the cognitive application 204 of the master device 202 such that when the cognitive application 204 receives the first and the second audio input, the cognitive application 204 is configured to analyze the first and the second audio input to identify a first set of voice parameters of the voice of the user 208 and a second set of voice parameters of the voice of the user 208, respectively. In some examples, the first set of voice parameters of the user 208 and the second set of voice parameters of the user 208 may include: a directional parameter associated with a direction that the voice of the user 208 is traveling in relation to the associated camera and/or a decibel parameter associated with a decibel level of the voice of the user 208. Next, the conferencing application 210 may execute an algorithm on the first set of voice parameters to identify a first location of the user 208 in relation to the first camera 212. The conferencing application 210 may additionally execute the algorithm on the second set of voice parameters to identify a second location of the user 208 in relation to the second camera 214. Responsive to identification of the first and the second location, the cognitive application 204 may be further configured to triangulate the first and the second location to identify a third location of the user 208 in relation to both the first camera 212 and the second camera 214. The identification of the third location of the user 208 may be fed back into the system and/or used to train the system to allow the cognitive application 204 to more accurately determine which camera to use when capturing the face of the user 208.

According to an additional embodiment, the conferencing application 210 may additionally receive a first audio input from the first camera 212 and a second audio input from a second camera 214. The conferencing application 210 may transmit both the first and the second audio input to the cognitive application 204 of the master device 202 such that when the cognitive application 204 receives the first and the second audio input, the cognitive application 204 is configured to analyze the first and the second audio input to identify a first set of voice parameters of a voice of the user 208 and a second set of voice parameters of the voice of the user 208, respectively. According to some examples, the cognitive application 204 may fail to detect the first and the second set of voice parameters. When such determination is made, the cognitive application 204 may then determine that the voice of the user 208 is not captured by the first or the second cameras and may disable the first and the second audio input. In further examples, the cognitive application 204 may generate a notification and transmit such notification to the conferencing application 210 of the device 206 for display to the user 208.

FIG. 3 is a flowchart of a process executed by a master device for dynamically switching between at least two cameras in communication with the master device during a conference, where the at least two cameras are associated with a device operable by a user, in accordance with embodiments of the present invention.

The system 300 of FIG. 3 include a master device (e.g., the master device 102 of FIG. 1) associated with a device (similar to the device 106 of FIG. 1) operable by a user (e.g., the user 108). In some examples, the device may also be associated with a monitor (e.g., the monitor 114 of FIG. 1) or one or more additional screens. The master device is configured to dynamically switch between at least two cameras in communication with the master device during a conference, such as a web-based conference, where the at least two cameras are static.

The process of FIG. 3 begins with a step 302. The step 302 is followed by a step 304, where the cognitive application of the master device (e.g., the cognitive application 104 of the master device 102 of FIG. 1), analyzes received first video input from a first camera (e.g., the first camera 112 of FIG. 1) and received second video input from a second camera (e.g., the second camera 118 of FIG. 1). The cognitive application may receive additional video input from additional cameras. According to some examples, the first camera and the second camera are attached to the device (e.g., the device 106 of FIG. 1). In other examples, the first camera is attached to the device and the second camera is attached to a monitor or another screen. In other embodiments, the cognitive application may receive first audio content from the first camera and second audio content from the second camera.

The step 304 is followed by a step 306, where the cognitive application of the master device analyzes the first video input to identify first directional parameters and the second video input to identify second directional parameters associated with a face of a user (e.g., the user 108 of FIG. 1). The first and the second directional parameters may include: a direction of eyes of the user and/or a direction of a face of the user in relation to the camera.

According to some examples, the cognitive application may fail to detect the first and the second directional parameters. Responsive to this determination, the cognitive application may determine that the face of the user is not captured by the first or the second cameras. The cognitive application may then disable the first and the second video input. According to some examples, the cognitive application may transmit a notification to a conferencing application (e.g., the conferencing application 110 of FIG. 1) executed on a device (e.g., the device 106 of FIG. 1) for display to a user of the device.

According to other examples, the cognitive application analyzes the first audio content to identify first voice parameters and the second audio content to identify second voice parameters associated with a voice of the user. According to some examples, the first and the second set of voice parameters are selected from the group consisting of: a directional parameter associated with a direction that the voice of the user is traveling in relation to the associated camera and a decibel parameter.

According to some examples, the cognitive application may fail to detect the first and the second voice parameters. Responsive to this determination, the cognitive application may determine that the voice of the user is not captured by the first or the second cameras. The cognitive application may then disable the first and the second audio input. According to some examples, the cognitive application may transmit a notification to a conferencing application executed on a device for display to the user of the device.

The step 306 is followed by a step 308, where the cognitive application of the master device executes facial recognition on the first and the second directional parameters to identify a first and a second coverage percentage of the face of the user. The first coverage percentage is a percentage that the user's face is covered or captured by the first camera and the second coverage percentage is a percentage that the user's face is covered or captured by the second camera.

The step 308 is followed by a step 310, where the cognitive application of the master device compares the first coverage percentage to the second coverage percentage.

The step 310 is followed by either a step 312A or a step 312B.

At the step 312A, the cognitive application of the master device identifies the first coverage percentage as being greater than the second coverage percentage. The step 312A is followed by a step 314A, where the cognitive application of the master device disables the second video feed associated with the second camera. The step 314A is then followed by a step 314B, where the cognitive application of the master device utilizes the first video feed to capture the face of the user. The step 314B is then followed by a step 316, which concludes the process.

At the step 312B, the cognitive application of the master device identifies the second coverage percentage as being greater than the first coverage percentage. The step 312B is then followed by a step 314C, where the cognitive application of the master device disables the first video feed associated with the first camera. The step 314C is then followed by a step 314D, where the cognitive application of the master device utilizes the second video feed to capture the face of the user. The step 314D is then followed by the step 316, which concludes the process.

FIG. 4 is a block diagram of a computing device included within the system of FIG. 1 and that implements the process of FIG. 3, in accordance with embodiments of the present invention.

In some embodiments, the present invention may be a system, a method, and/or a computer program product. For example, a computing device (e.g., the master device 102 of FIG. 1) is utilized for dynamically switching between at least two cameras in communication with the computing device during a conference, such as a web-based conference, where the at least two cameras are static and are associated with another device (e.g., the device 106 of FIG. 1) operable by a user. The other device is associated with and connected to the master device. In an example, basic configuration 402, the computing device 400 includes one or more processors 404 and a system memory 406. A memory bus 408 is used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a level cache memory 412, an example processor core 414, and registers 416, among other examples. The example processor core 414 may include an arithmetic logic unit (ALU), a floating point unit (FPU), a digital signal processing core (DSP Core), or any combination thereof. An example memory controller 418 is used with the processor 404, or in some implementations the example memory controller 418 is an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 includes an operating system 420, one or more engines, such as a cognitive application 423, and program data 424. In some embodiments, the cognitive application 423 may be a cognitive analysis engine or a cognitive analysis service.

The cognitive application 423 of the master device may receive a first video input from a first camera and a second video input from a second camera. The cognitive application 423 may then analyze the first video input to identify first directional parameters and the second video input to identify second directional parameters of a face of the user. The cognitive application 423 may then execute an algorithm on the first directional parameters to identify a first percentage associated with facial coverage of the user. The cognitive application 423 may then execute the algorithm on the second directional parameters to identify a second percentage associated with facial coverage of the user. Next, the cognitive application 423 may compare the first to the second percentage. Then, if the cognitive application 423 identifies the first percentage as being greater than the second percentage, the cognitive application 423 disables the second video input associated with the second camera and utilizes the first video input to capture the face of the user. However, if the cognitive application 423 identifies the second percentage as being greater than the first percentage, the cognitive application 423 disables the first video input associated with the first camera and utilizes the second video input to capture the face of the user.

The computing device 400 may have additional features or functionality, and additional interfaces to facilitate communications between the basic configuration 402 and any desired devices and interfaces. For example, a bus/interface controller 430 is used to facilitate communications between the basic configuration 402 and data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives, among others. Example computer storage media includes volatile and non-volatile, removable and non-removable media implemented in any method or technology for storage of information, such as computer-readable instructions, data structures, program modules, or other data.

In some embodiments, an interface bus 440 facilitates communication from various interface devices (e.g., one or more output devices 442, one or more peripheral interfaces 444, and one or more communication devices 466) to the basic configuration 402 via the bus/interface controller 430. Some of the one or more output devices 442 include a graphics processing unit 448 and an audio processing unit 450, which is configured to communicate to various external devices such as a display or speakers via one or more A/V ports 452. The one or more peripheral interfaces 444 includes a serial interface controller 454 or a parallel interface controller 456, which are configured to communicate with external devices, such as input devices (e.g., keyboard, mouse, pen, voice input device, touch input device, etc.) or other peripheral devices (e.g., printer, scanner, etc.) via one or more I/O ports 458. An example of the one or more communication devices 466 include a network controller 460, which are arranged to facilitate communications with one or more other computing devices 462 over a network communication link via one or more communication ports 464. The one or more other computing devices 462 include servers, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media include wired media, such as a wired network or direct-wired connection, and wireless media, such as acoustic, radio frequency (RF), microwave, infrared (IR), and other wireless media. The term "computer-readable media," as used herein, includes both storage media and communication media.

The system memory 406, the removable storage devices 436, and the non-removable storage devices 438 are examples of the computer-readable storage media. The computer-readable storage media is a tangible device that can retain and store instructions (e.g., program code) for use by an instruction execution device (e.g., the computing device 400). Any such, computer storage media is part of the computing device 400.

Aspects of the present invention are described herein regarding flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by the computer-readable instructions (e.g., the program code).

The computer-readable instructions are provided to the processor 404 of a general purpose computer, special purpose computer, or other programmable data processing apparatus (e.g., the computing device 400) to produce a machine, such that the instructions, which execute via the processor 404 of the computer or other programmable data processing apparatus, create means for implementing the functions/acts specified in the flowchart and/or block diagram block or blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable instructions (e.g., the program code) are also loaded onto a computer (e.g. the computing device 400), another programmable data processing apparatus, or another device to cause a series of operational steps to be performed on the computer, the other programmable apparatus, or the other device to produce a computer implemented process, such that the instructions which execute on the computer, the other programmable apparatus, or the other device implement the functions/acts specified in the flowchart and/or block diagram block or blocks.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computing device 400 or the computing device 102 (of FIG. 1) may be implemented as a part of a general purpose or specialized server, mainframe, or similar computer that includes any of the above functions. The computing device 400 or the computing device 102 (of FIG. 1) may also be implemented as a personal computer including both laptop computer and non-laptop computer configurations.

Another embodiment of the invention provides a method that performs the process steps on a subscription, advertising and/or fee basis. That is, a service provider, such as a Solution Integrator, can offer to create, maintain, and/or support, etc. a process of dynamically switching between at least two cameras in communication with the computer program product during a conference, where the at least two cameras are associated with a device operable by a user. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for dynamically switching between at least two cameras in communication with a device operable by a user, said method comprising:
analyzing a first video input received from a first camera of the at least two cameras to identify first directional parameters of a face of the user and a second video input received from a second camera of the at least two cameras to identify second directional parameters of the face of the user;
executing a first algorithm on the first directional parameters to identify a first percentage associated with facial coverage of the user and on the second directional parameters to identify a second percentage associated with facial coverage of the user;
determining that the first percentage is greater than the second percentage and in response, utilizing the first video input to capture the face of the user and disabling the second video input,
wherein the first camera and the second camera are attached to the device, the first camera is attached to the device and the second camera is attached to a monitor associated with the device, or the first camera is attached to the monitor associated with the device and the second camera is attached to the device.

2. The method of claim 1, wherein the first and the second directional parameters are selected from the group consisting of a direction of eyes of the user and a direction of the face of the user.

3. The method of claim 1, wherein the first algorithm is a facial recognition algorithm.

4. The method of claim 1, wherein the at least two cameras are static.

5. The method of claim 1, said method further comprising:
receiving a first audio input from the first camera and a second audio input from the second camera;
analyzing the first audio input to identify a first set of voice parameters associated with a voice of the user; and
analyzing the second audio input to identify a second set of voice parameters associated with the voice of the user.

6. The method of claim 5, wherein the first and the second set of voice parameters are selected from the group consisting of a directional parameter associated with a direction that the voice of the user is traveling and a decibel parameter.

7. The method of claim 5, said method further comprising:
executing a second algorithm on the first set of voice parameters to identify a first location of the user in relation to the first camera; and
executing the second algorithm on the second set of voice parameters to identify a second location of the user in relation to the first camera.

8. The method of claim 7, said method further comprising:
triangulating the first and the second location to identify a third location of the user in relation to the first and the second camera.

9. A computer system, comprising one or more processors, one or more memories, and one or more computer-readable hardware storage devices, the one or more computer-readable hardware storage devices containing program code executable by the one or more processors via the one or more memories to implement a method for dynamically switching between at least two cameras in communication with a device operable by a user, said method comprising:
analyzing a first video input received from a first camera of the at least two cameras to identify first directional parameters of a face of the user and a second video input received from a second camera of the at least two cameras to identify second directional parameters of the face of the user;
executing a first algorithm on the first directional parameters to identify a first percentage associated with facial coverage of the user and on the second directional parameters to identify a second percentage associated with facial coverage of the user;
determining that the first percentage is greater than the second percentage and in response, utilizing the first video input to capture the face of the user and disabling the second video input,
wherein the first camera and the second camera are attached to the device, the first camera is attached to the device and the second camera is attached to a monitor associated with the device, or the first camera is attached to the monitor associated with the device and the second camera is attached to the device.

10. The computer system of claim 9, wherein the first and the second directional parameters are selected from the group consisting of a direction of eyes of the user and a direction of the face of the user.

11. The computer system of claim 9, wherein the first algorithm is a facial recognition algorithm.

12. The computer system of claim 9, wherein the at least two cameras are static.

13. The computer system of claim 9, said method further comprising:
receiving a first audio input from the first camera and a second audio input from the second camera;
analyzing the first audio input to identify a first set of voice parameters associated with a voice of the user; and
analyzing the second audio input to identify a second set of voice parameters associated with the voice of the user.

14. The computer system of claim 13, wherein the first and the second set of voice parameters are selected from the group consisting of a directional parameter associated with a direction that the voice of the user is traveling and a decibel parameter.

15. A computer program product, comprising one or more computer-readable hardware storage devices having computer-readable program code stored therein, the computer-readable program code containing instructions executable by one or more processors of a computer system to implement a method for dynamically switching between at least two cameras in communication with a device operable by a user, said method comprising:
analyzing a first video input received from a first camera of the at least two cameras to identify first directional parameters of a face of the user and a second video input received from a second camera of the at least two cameras to identify second directional parameters of the face of the user;
executing a first algorithm on the first directional parameters to identify a first percentage associated with facial coverage of the user and on the second directional parameters to identify a second percentage associated with facial coverage of the user;
determining that the first percentage is greater than the second percentage and in response, utilizing the first video input to capture the face of the user and disabling the second video input,
wherein the first camera and the second camera are attached to the device, the first camera is attached to the device and the second camera is attached to a monitor associated with the device, or the first camera is attached to the monitor associated with the device and the second camera is attached to the device.

16. The computer program product of claim 15, wherein the first and the second directional parameters are selected from the group consisting of a direction of eyes of the user and a direction of the face of the user.

17. The computer program product of claim 15, wherein the first algorithm is a facial recognition algorithm.

18. The computer program product of claim 15, wherein the at least two cameras are static.

19. The computer program product of claim 15, said method further comprising:
receiving a first audio input from the first camera and a second audio input from the second camera;
analyzing the first audio input to identify a first set of voice parameters associated with a voice of the user; and
analyzing the second audio input to identify a second set of voice parameters associated with the voice of the user.

20. The computer program product of claim 19, wherein the first and the second set of voice parameters are selected from the group consisting of a directional parameter associated with a direction that the voice of the user is traveling and a decibel parameter.

* * * * *